(12) United States Patent
Chen et al.

(10) Patent No.: US 12,050,294 B1
(45) Date of Patent: Jul. 30, 2024

(54) METHOD AND APPARATUS FOR BUILDING ENVELOPE GUIDED LOW FREQUENCY MODEL FOR SEISMIC EXPLORATION OF SUBSURFACE FORMATIONS

(71) Applicant: CHINA PETROLEUM & CHEMICAL CORPORATION, Beijing (CN)

(72) Inventors: Yequan Chen, Houston, TX (US); Fan Xia, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 2 days.

(21) Appl. No.: 18/166,338

(22) Filed: Feb. 8, 2023

(51) Int. Cl.
*G01V 1/28* (2006.01)
*G01V 1/104* (2006.01)
*G01V 1/50* (2006.01)

(52) U.S. Cl.
CPC .............. *G01V 1/282* (2013.01); *G01V 1/104* (2013.01); *G01V 1/50* (2013.01); *G01V 2210/1212* (2013.01); *G01V 2210/6242* (2013.01)

(58) Field of Classification Search
CPC .......... G01V 1/282; G01V 1/104; G01V 1/50; G01V 2210/1212; G01V 2210/6242
See application file for complete search history.

(56) References Cited

U.S. PATENT DOCUMENTS

| | | | | |
|---|---|---|---|---|
| 8,612,156 | B2* | 12/2013 | Gulati | G01V 1/301 702/14 |
| 10,436,927 | B2* | 10/2019 | Sun | G01V 1/364 |
| 10,802,167 | B2* | 10/2020 | Brenders | G06F 30/00 |
| 2009/0132169 | A1 | 5/2009 | Bordakov | |
| 2012/0080197 | A1* | 4/2012 | Dickens | G01V 3/12 703/2 |
| 2014/0052377 | A1 | 2/2014 | Downie | |
| 2017/0248716 | A1 | 8/2017 | Poole | |

(Continued)

OTHER PUBLICATIONS

Chen et al., "The Interpolation of Sparse Geophysical Data", Surveys in Geophysics (2019) 40:73-105 (Year: 2019).*

(Continued)

*Primary Examiner* — Mischita L Henson
(74) *Attorney, Agent, or Firm* — NKL Law; Allen Xue

(57) ABSTRACT

A method and system for generating and displaying a low frequency model for a seismic survey region are provided. The method and system may include defining a seismic survey geometry of the seismic survey region; processing seismic data to generate a stacked seismic data and well log data to obtain elastic attributes; importing stacked seismic data and processed well log data into the defined seismic survey geometry; generating envelope data using the stacked seismic data; generating a low frequency trace for each well; calculating a least-squares optimized coefficient model at each well location based upon the generated envelope data and the low frequency trace for each well; interpolating the coefficient model to the seismic survey geometry using a covariance technique and the imported stacked seismic data; and generating a three-dimensional low frequency model by inversion using the envelope data and the interpolated coefficient model for display.

20 Claims, 11 Drawing Sheets

(56) References Cited

U.S. PATENT DOCUMENTS

2019/0250305 A1    8/2019  Thompson et al.

OTHER PUBLICATIONS

Matheron, G.; "Principles of Geostatistics"; Economic Geology; vol. 58; Year: 1963; pp. 1246-1266.
Douma, Johannes et al.; "Application of image-guided interpolation to build low frequency background model prior to inversion"; Amsterdam RAI; The Netherlands, 76th EAGE Conference & Exhibition 2014; Jun. 16-19, 2014; pp. 1-5.
Wu, Ru-Shan et al.; "Seismic envelope inversion and modulation signal model"; Geophysics; vol. 79, No. 3; May-Jun. 2014; pp. WA13-WA24.
Shepard, Donald; "A two-dimensional interpolation function for irregularly-spaced data"; ACM National Conference; Year 1968; pp. 517-524.
Hale, Dave et al.; "Image-guided blended neighbor interpolation of scattered data"; Image guided blended neighbor interpolation of scattered data: 79th Annual International Meeting; Year: 2009; pp. 1127-1131.
USPTO, International search report, Feb. 16, 2024.

\* cited by examiner

METHOD AND APPARATUS FOR BUILDING ENVELOPE GUIDED LOW FREQUENCY MODEL FOR SEISMIC EXPLORATION OF SUBSURFACE FORMATIONS

TECHNICAL FIELD

The present disclosure relates to building an improved low frequency model to regularize seismic inversion to improve the accuracy of seismic inversion to enhance images of subsurface structures in a survey region for reservoir characterization.

BACKGROUND

It is well known that lithology identification and fluid discrimination plays an important role in seismic exploration and reservoir characterization. Seismic inversion is the process of transforming seismic data into models and images for reservoir characterization. One or more sonic sources generate seismic waves (sound waves), which come into contact with subsurface structures. Seismic data may be reflection data and/or refraction data, which represent the reflections and/or refractions of the seismic waves coming into contact with the subsurface formations (subsurface structures). Seismic data is generally limited to the range from 6-8 Hz to 60-80 Hz so that conventional seismic data lacks information in the low frequency range, e.g., lower than 8 Hz or 12 Hz. A low frequency model is used to regularize seismic inversion and fill the low frequency gap of seismic data. A reliable low frequency model can greatly help to improve the accuracy of seismic inversion for reservoir characterization.

A low frequency trace at a well location in the survey region may be created using a low frequency filtered version of well log data (which is based on seismic data). Low frequency model building is a process that interpolates the low frequency traces between a few known well locations onto a uniform three-dimensional (3D) sampling seismic survey space. The low frequency traces at the well locations are often scattered sparsely within the seismic survey space. However, it is challenging to build a reliable 3D volume of a low frequency model with sparse well locations using conventional techniques.

In a conventional technique, Shephard (Shepard, D., 1968, A two-dimensional interpolation function for irregularly-spaced data: Proceedings of the 1968 ACM National Conference, 517-524) proposed a commonly used method for building a low frequency model using inverse distance weighting interpolation. This method interpolates the low frequency model as a function of a continuous parameter, given several known low frequency traces at discrete locations. However, in a geological area, such a smoothing method will violate, e.g., be inconsistent with, the subsurface structures. An alternative practice is to pick horizons corresponding to coherent reflections in the seismic data and employing the Kriging method (Matheron, G., 1963, Principles of geostatistics, Econ. Geol. 58, 1246-1266; Davis, J. C., 2002, Statistics and Data Analysis in Geology, 3rd edition, Wiley, New York) to build a low frequency model with the guidance of picked horizons. However, horizon picking can be both tedious and time consuming (Douma and Naeini, 2014, Application of Image-guided Interpolation to Build Low Frequency Background Model Prior to Inversion: 76th Annual International Conference and Exhibition, EAGE, Extended Abstracts, We G106.05). However, these traditional methods for interpolation fail in very sparse known discrete locations in the survey region. These traditional methods will introduce a bulls-eye effect into a low frequency model and degrade the accuracy of the low frequency model.

In another conventional technique, Hale (Hale, D., 2009, Image guided blended neighbor interpolation of scattered data: 79th Annual International Meeting, SEG, Expanded Abstracts, 1127-1131) employed the blended neighbor method that uses the tensor field (or structural dips and azimuths) computed from seismic image to build the low frequency model. However, the low frequency model generated by using Hale's method cannot capture the lithology variation that is embedded in the seismic amplitude and phase information for reservoir characterization.

Accordingly, there is a need to provide new methods for generating low frequency models to improve the accuracy of seismic inversion to improve images of subsurface structures in a survey region for reservoir characterization.

SUMMARY

In an aspect, there is provided an envelope guided low frequency model building technique to solve the above problems and improve the accuracy of seismic inversion to improve images of subsurface structures in a survey region for reservoir characterization. One or more embodiments use envelope data as a guide to invert a low frequency model onto a uniform three-dimensional (3D) sampling of seismic survey space (seismic survey geometry). One or more embodiments include an envelope guided low frequency model building technique to overcome the inaccuracy of bulls-eye effect in conventional low frequency model building methods. One or more embodiments include an envelope guided low frequency model building technique to conform to the subsurface structures in the survey region as well as to capture the amplitude and phase information embedded in the respective features in the seismic data for reservoir characterization.

In an aspect, there is provided a method for generating and displaying a low frequency model for a seismic survey region. The method may include positioning seismic data recording sensors in the seismic survey region at different locations; positioning a well logging tool including one or more well log data recording sensors in one or more wells in the seismic survey region; blasting at points of incidence in the seismic survey region to generate seismic waves, which travel through subsurface structures; sensing the seismic waves and recording seismic data using the seismic data recording sensors; sensing and recording well log data using the well log data recording sensors; transmitting the seismic data from the seismic data recording sensors to a computer system including one or more memories and storing the seismic data in one or more memories; transmitting the well log data from the well log data recording sensors to a computer system including one or more memories and storing the well log data in one or more memories; defining a seismic survey geometry of the seismic survey region; processing seismic data to generate a stacked seismic data; processing well log data to obtain elastic attributes; importing stacked seismic data into the defined seismic survey geometry; importing processed well log data into the defined seismic survey geometry; generating envelope data using the stacked seismic data in the defined seismic survey geometry; generating a low frequency trace for each well in the seismic survey region; calculating a least-squares optimized coefficient model at each well location based upon the generated envelope data and the low frequency trace for each well; interpolating the coefficient model to the seismic survey geometry using a covariance technique and the imported stacked seismic data; generating a three-dimensional low frequency model by inversion using the envelope data and the interpolated coefficient model; and displaying image of the generated three-dimensional low frequency model of the seismic survey region.

In an aspect, the elastic attributes may include one or more of P-wave velocity, S-wave velocity, and density.

In an aspect, the one or more wells in the seismic survey region may be a plurality of wells and a plurality of well locations may be one of the plurality of wells.

In an aspect, the seismic survey geometry of the seismic survey region may include envelope data for each well at each well location and a low frequency trace for each well at each well location.

In an aspect, the calculating a least-squares optimized coefficient model at each well location based upon the generated envelope data and the low frequency trace for each well may further include (a) selecting a well location; (b) extracting an envelope trace from the generated envelope data for the selected well location and extracting the low frequency trace for the selected well location from the plurality of low frequency traces; and (c) solving a least squares optimization problem d'e=F'm' for a coefficient model m' at the well location, where, d' denotes the extracted envelope trace at the well location, and F' denotes the operator that contains low frequency trace at the well location.

In an aspect, the calculating a least-squares optimized coefficient model at each well location based upon the generated envelope data and the low frequency trace for each well may further include (d) repeating operations (a) through (c) until the least squares optimization problem is solved for each well; and (e) outputting the computed coefficient model at each well location.

In an aspect, the interpolating the coefficient model to the seismic survey geometry using a covariance technique and using the imported stacked seismic data may further include (f) extracting seismic traces at each well location; (g) selecting a well location from the plurality of well locations; (h) generating a correlation map by computing a correlation coefficient between the seismic trace at the selected well location and all seismic traces in the seismic survey geometry; (i) repeating operations (g) and (h) until the correlation map has been generated for each well location in the seismic survey geometry; (j) outputting correlation coefficient maps at all well locations; (k) computing the weighting paraments for all well locations; (l) interpolating each coefficient model at each well location to the entire seismic survey geometry; and (m) outputting the interpolated coefficient model to the entire seismic survey geometry.

In an aspect, the weighting parameters are computed using the following equation:

$$p_i(x) = \begin{cases} \dfrac{\hat{v}_i(x)}{\sum_{i=1}^{N} \hat{v}_i(x)}, & \text{if } v_i \neq 1 \text{ for all } i, \\ 1, & \text{if any } v_i = 1 \text{ for some } i, \end{cases}$$

where, $\hat{v}$ denotes the mathematical transformation from v with power parameter, i denotes the index of well location, $p_i(x)$ denotes the weighting parament p at a given point x, and N denotes the number of well locations.

In an aspect, the interpolating the coefficient model to the seismic survey geometry using a covariance technique and the imported stacked seismic data further comprises inputting the computed coefficient model at each well location and interpolating the coefficient model to the seismic survey geometry based on the computed coefficient model at each well location and weighted parameters in accordance with the following equation:

$$m(x) = \sum_{i=1}^{N} p_i(x) m'_i$$

where the subscript i denotes the index of well location, $p_i(x)$ denotes the weighting parament p at a given point x, N denotes the number of well locations, m(x) denotes the coefficient model at a given point x, and $m'_i$ denotes the coefficient model at the well location.

In an aspect, the generating the three-dimensional low frequency model by inversion using the envelope data and the interpolated coefficient model comprises combining the interpolated coefficient model and the envelope data using a multivariate regression $$\Psi = \min \|d_e - Mx\|_2$$

where $\Psi$ denotes the multivariate regression objective function, $d_e$ denotes the computed envelope data in the whole survey, M is the operator that contains the coefficient model, and x is the low frequency model.

In an aspect, there is provided a system for generating and displaying a low frequency model for a seismic survey region. The system may include a blasting device positioned at each point of incidence in the seismic survey region to generate seismic waves, which travel through subsurface structures; a plurality of seismic data recording sensors, which are positioned in the seismic survey region at different locations to sense and record seismic data and to transmit the seismic data to a computer system including one or more memories which store the seismic data in the one or more memories; and a well logging tool including one or more well log data recording sensors, which is positioned in one or more well bores in the seismic survey region, to sense and record well log data and to transmit the well log data to the computer system including the one or more memories which store the well log data. The computer system may further include at least one processor and stores instructions in the one or more memories, and wherein the one or more processors execute the instructions stored in the one or more memories to implement: defining a seismic survey geometry of the seismic survey region; processing seismic data to generate a stacked seismic data; processing well log data to obtain elastic attributes; importing stacked seismic data into the defined seismic survey geometry; importing processed well log data into the defined seismic survey geometry; generating envelope data using the stacked seismic data in the defined seismic survey geometry; generating a low frequency trace for each well in the seismic survey region; calculating a least-squares optimized coefficient model at each well location based upon the generated envelope data and the low frequency trace for each well; interpolating the coefficient model to the seismic survey geometry using a covariance technique and the imported stacked seismic data; generating a three-dimensional low frequency model by inversion using the envelope data and the interpolated coefficient model; and displaying image of the generated three-dimensional low frequency model of the seismic survey region.

DETAILED DESCRIPTION

Figure 1:
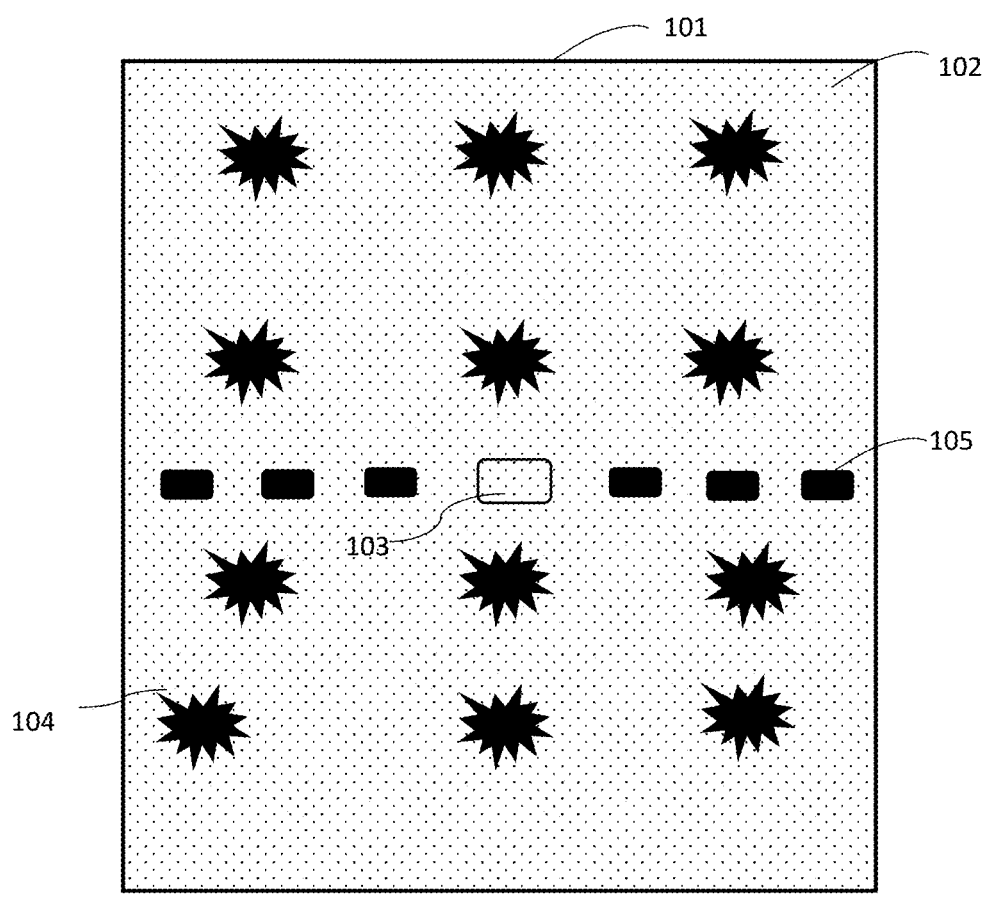
FIG. 1 is a is a schematic diagram illustrating a top view of a survey region with the various points of incidence of seismic sources according to an embodiment.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

Throughout the specification, the terms approach(es), technique(s), technology(ies), and method(s) are used interchangeably and have the same meaning.

Throughout the specification, the terms subsurface structure(s), formation(s), and subsurface formation(s) are used interchangeably.

Throughout the specification, the terms seismic attribute (s) and geological attribute(s) are used interchangeably.

Throughout the specification the terms recorder(s) and receiver(s) are used interchangeably.

Throughout the specification, the terms data space, working data space, working area, and working space are used interchangeably.

The present disclosure relates to building an improved low frequency model to regularize seismic inversion to fill the low frequency gap of seismic data to improve the accuracy of seismic inversion to improve images of subsurface structures (formations) in a survey region for reservoir characterization.

FIGS. 1-4 show exemplary embodiments of methods, apparatuses, and mediums for obtaining and storing the seismic data and/or well log data, which is processed to generate one or more high-resolution geological models for high resolution images for lithology identification, fluid discrimination, and reservoir characterization of subsurface structures of a survey region. The survey region may be subsurface structures under land or subsurface structures under a body of water such as the ocean. Using the seismic data and/or well log data obtained from the survey region and stored in one or more memories, FIGS. 5-14 show exemplary embodiments of apparatuses, methods, and mediums to provide an improvement in the quality of seismic inversion results for reservoir characterization by using an improved low frequency model technology to generate improved high-resolution images to improve lithology identification, fluid discrimination, and reservoir characterization of subsurface structures of a survey region in the field of seismic exploration. For example, FIGS. 5-14 show exemplary embodiments of apparatuses, methods, and mediums to provide envelope data as a guide to invert a low frequency model onto a uniform three-dimensional (3D) sampling of seismic survey space.

FIG. 1 is a schematic diagram illustrating a top view of a survey region with the various points of incidence of seismic sources according to an embodiment. More specifically, FIG. 1 illustrates a seismic survey region (survey region) 101, which is a land-based region in this example. Reference numeral 102 denotes a top earth formation of the land-based region. Persons of ordinary skill in the art, will recognize that seismic survey regions produce detailed images of local geology to determine the location and size of possible hydrocarbon (oil and gas) reservoirs, and therefore a potential well location 103. In these survey regions, seismic waves bounce off underground rock formations during emissions from one or more seismic sources at various points of incidence 104. A blast is an example of a seismic source generated by seismic equipment. The seismic waves that reflect or refract back to the surface are captured by seismic data recording sensors 105, transmitted by one or more data transmission systems (frequently wirelessly) from the seismic data recording sensors 105, and stored for later processing and analysis by a high-performance computing system. Although this example shows a top earth formation 102 of a land-based region, it is understood that this is only an example and the methods and system may also be applied to a survey region at the bottom of a body of water such as an ocean. A user can define the survey region, which may be on land or at the bottom of a body of water such as an ocean.

Figure 2:
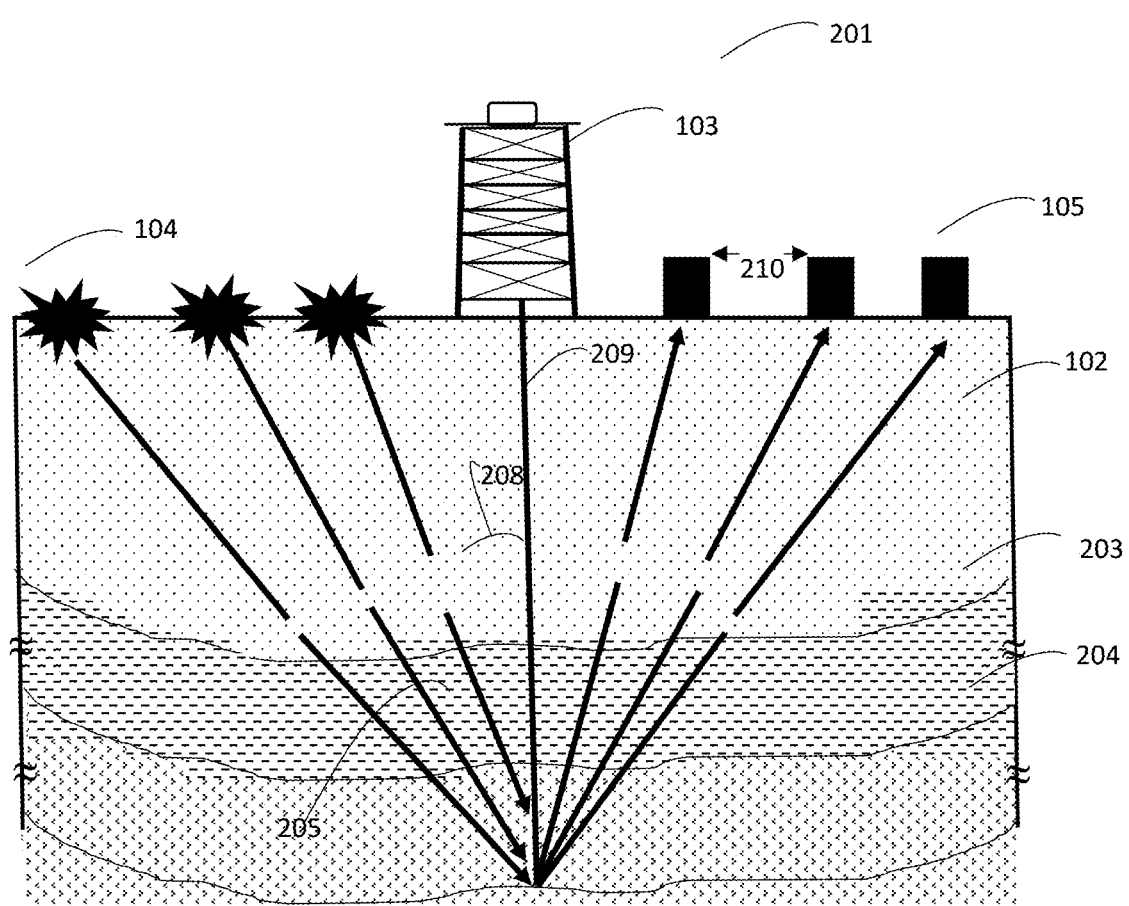
FIG. 2 is a schematic diagram illustrating a cross-sectional view of an environment with points of incidence of seismic sources, seismic data recording sensors, a well location, a wellbore, the various transmission rays, and the various angles of incidence, according to an embodiment.

FIG. 2 is a schematic diagram illustrating a cross-sectional view of a seismic survey region 101 in FIG. 1 with points of incidence of seismic sources, seismic data recording sensors (seismic receivers), a well location, a wellbore, various transmission rays, and various angles of incidence, according to an embodiment. More specifically, in FIG. 2 a cross-sectional view of a portion of the earth over the seismic survey region is denoted by reference numeral 201, showing different types of earth formations denoted by reference numerals 102, 203, and 204. Although the seismic survey region is based on land in this example, it is understood that this is only an example and the methods and system may also be applied to a survey region at the bottom of a body of water such as an ocean.

FIG. 2 illustrates a common midpoint-style gather, where seismic data are sorted by surface geometry to approximate a single reflection point in the earth. The survey seismic data may also be referred to as traces, gathers, or image gathers. In this example in FIG. 2, data from one or more shots or blasts and receivers may be combined into a single image gather or used individually depending upon the type of analysis to be performed. Although FIG. 2 shows earth formations 102, 203, and 204 at different depths of a seismic survey region, it is understood that these are only examples and there may be different earth formations within the formations denoted by 102, 203, and 204 in FIG. 2. In addition, a user may define a seismic survey region as only one or more formations in the top surface formation 102 instead of all three formations 102, 203, and 204 at different at different depths. A user can define the survey region, which may be on land or at the bottom of a body of water such as an ocean.

As shown on FIG. 2, one or more shots or blasts represents seismic sources located at various points of incidence or stations denoted by reference numeral 104 at the surface of the Earth at which one or more seismic sources are activated. Seismic energy or seismic sources from multiple points of incidence 104, will be reflected from the interface between the different earth formations. These reflections will be captured by multiple seismic data recording sensors 105, each of which will be placed at different location offsets 210 from each other, and the well location 103. Because all points of incidences 104, and all seismic data recording sensors 105 are placed at different offsets 210, the survey seismic data or traces, also known in the art as gathers or image gathers, will be recorded at various angles of incidence represented by 208. The points of incidence 104 generate downward transmission rays 205, in the earth that are captured by their upward transmission reflection through the seismic data recording sensors 105. Although FIG. 2 shows upward reflection transmission, it is understood that the seismic data, which is recorded by seismic data recording sensors (recorders), may be related to reflections and/or refractions of seismic waves under the surface of the earth in response to sources, which may be seismic equipment causing blasts or by other source generating equipment which generates seismic waves under the surface of the earth. In addition, in the example shown in FIG. 2, well location 103 is illustrated with an existing drilled well and a well logging tool 209, along which multiple measurements are obtained using techniques known in the art. This well logging tool 209, is used to obtain well log data, which may include P-wave velocity, S-wave velocity, Density. First seismic data from the seismic survey region may be received and recorded by one or more well log data recording sensors and then well log data including P-wave velocity, S-wave velocity, density and other well log data may be calculated from the seismic data by the well log data recording sensors. Alternatively, the well log data recording sensors may simply transmit the seismic data to a computer system, which computes the well log data. The well log data recording sensors may be the same as the seismic data recording sensors 105.

The seismic data captured by the well log data recording sensors may be used to examine the dependence of amplitude, signal-to-noise, move-out, frequency content, phase, azimuth, and other seismic attributes that are important for data processing and imaging of a seismic survey region.

Figure 3:
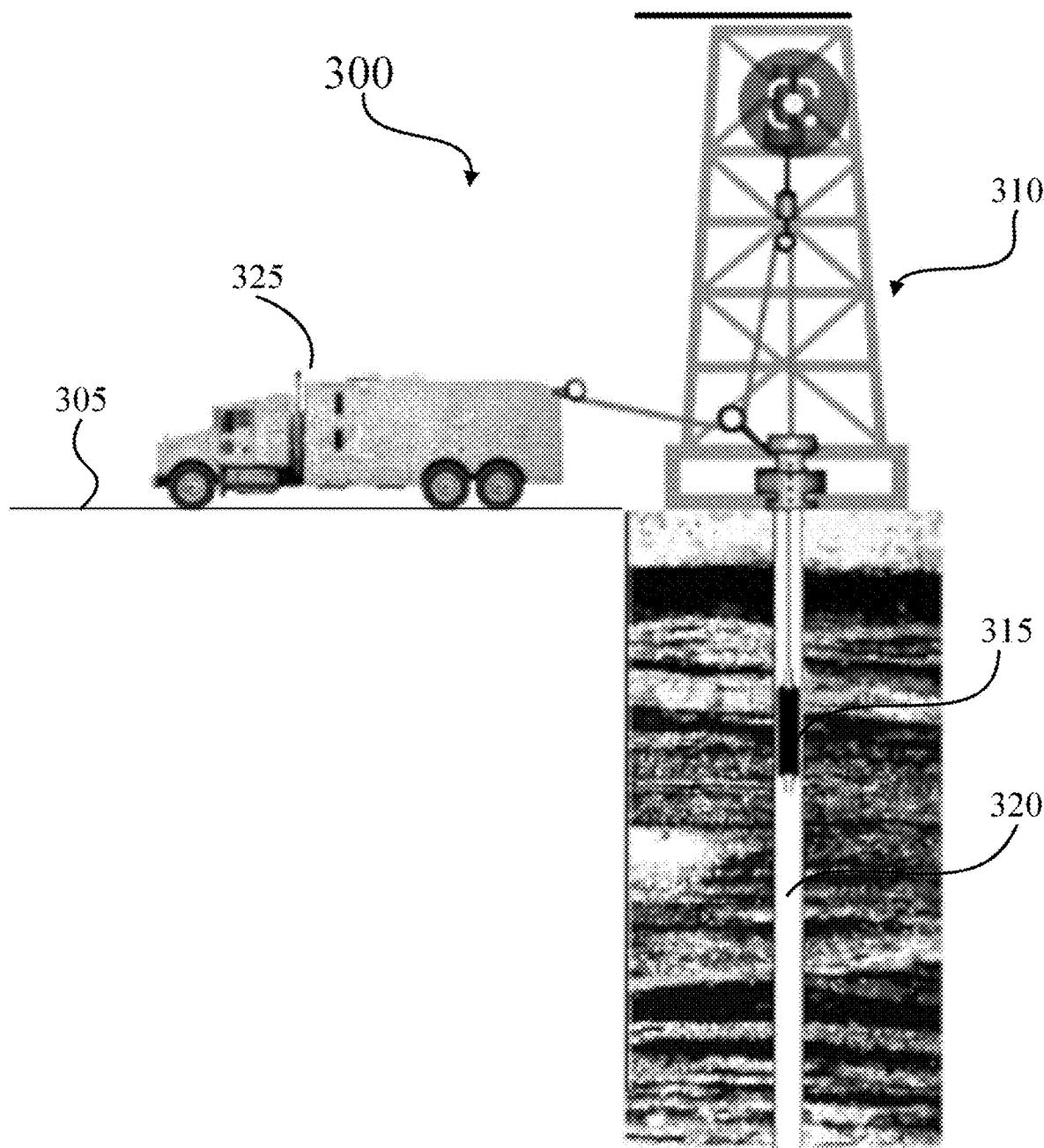
FIG. 3 is a schematic diagram illustrating a cross-sectional view of an environment with a wellbore and a well logging tool including one or more sonic generators and one or more well log data recording sensors according to an embodiment.

FIG. 3 is schematic diagram illustrating a cross-sectional view of a seismic survey region with a wellbore and well logging tool including one or more sonic generators and one or more well log data recording sensors according to an embodiment. A sonic generator is an example of equipment to produce one or more sonic waves (sound waves). A sonic generator may be referred to as a sonic source because the sonic generator produces or generates one or more sonic waves (sound waves) which are also referred to as seismic waves. The one or more well log data recording sensors are examples of one or more seismic data recording sensors (seismic receivers or seismic data recorders). However, the well log data recording sensors may also additionally calculate well log data such as P-wave velocity, S-wave velocity, density and other well log data. In embodiments of the present invention, oil and/or gas production is discontinued in order to generate seismic waves and record seismic data including reflections of the seismic waves and refractions of seismic data moving through the subsurface of one or more earth formations in the seismic survey region. A seismic survey region may have one or more wellbores with one or more well logging tools including one or more sonic generators and one or more well log data recording sensors.

FIG. 3 shows an oil drilling system 300 on land 305 including a drilling rig 310. The drilling rig 310 supports the lowering of a well logging tool 315 into a wellbore 320. The well logging tool 315 may include one or more sonic generators (sonic sources) to generate one or more sound waves, which are transmitted into one or more earth formations to generate reflection or reflection waves in the one or more earth formations. Although this example shows one or more earth formations of a land-based survey region, it is understood that this is only an example and that the methods and systems may also be applied to a survey region at the surface or bottom of a body of water such as an ocean. The well logging tool 315 also includes one or more well log data recording sensors. As discussed above, the one or more well log data recording sensors (similar to or the same as seismic data recording sensors 105) receive and record well log data, which may include reflection data and/or refraction data received by the one or more well log data recording sensors in response to the seismic waves (sound waves) transmitted into one or more earth formations by the one or more sonic generators. In addition, the well log data recording sensors may calculate well log data from the recorded seismic data. Alternatively, the seismic data recorded by the well log data recording sensors may transmit the seismic data to a computer to calculate the well log data. The well log data may include data, which is based on reflection data, such as compression wave velocity (Vp), shear wave velocity (Vs), and density, which is an indicator of porosity. This well logging process to record well log data may also be referred to as sonic logging or wireline logging. A vehicle 325 may be coupled to the well logging tool 315 to assist in the lowering and raising of the well logging tool 315 as well as communicating with the well logging tool 315 to obtain well log data. Alternatively, in methods and systems for a survey region at the surface or bottom of a body of water such as an ocean, another device or system may be used to assist in the lowering or raising of the well logging tool 315 as well as communicating with the well logging tool 315 to obtain well log data.

Figure 4:
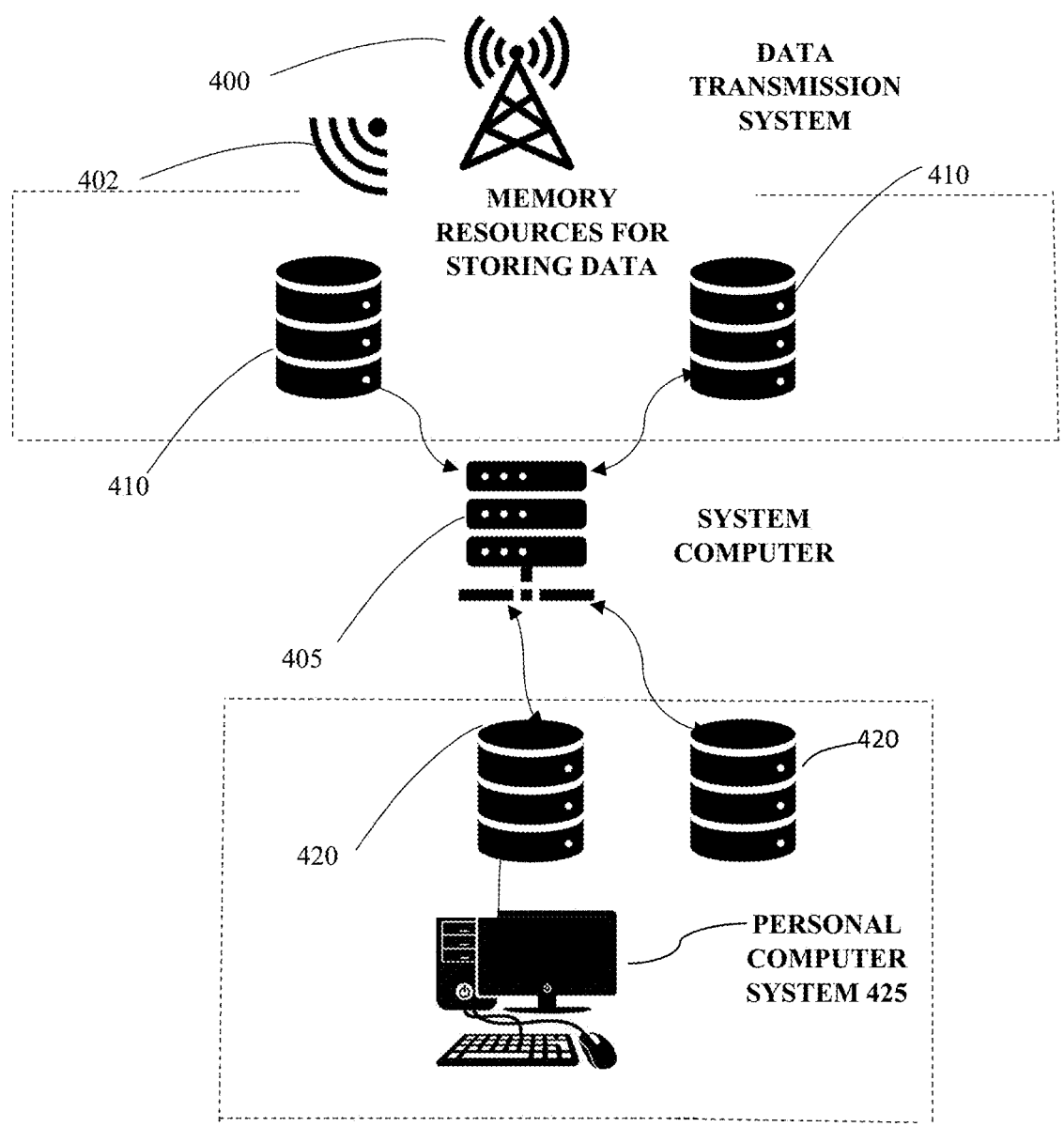
FIG. 4 is a schematic diagram illustrating a high-performance computing system according to an embodiment.

FIG. 4 is a schematic diagram illustrating a high-performance computer system according to an embodiment, which receives (frequently wirelessly) seismic data regarding seismic waves from the seismic data recording sensors 105 in FIGS. 1 and 2 and/or the seismic data recording sensors in FIG. 3, which are also referred to as well log data recording sensors in FIG. 3. The high-performance computer system in FIG. 4 stores the seismic data in at least one memory for later processing and analysis by computer implemented methods and apparatuses of one or more embodiments. The analyzed or processed seismic data may be accessed by a personal computer system. More specifically, FIG. 4 shows a data transmission system 400 for wirelessly transmitting seismic data from seismic data recording sensors to a system computer 405 coupled to one or more storage devices 410 to store the seismic data in databases. The data transmission system may also transmit wirelessly seismic data from seismic data recording sensors 105 directly to one or more storage devices 410 to store the seismic data in databases, which may be accessed by system computer 405. As discussed above, a well log data recording sensor is an example of a seismic data recording sensor 105 positioned in a wellbore. The wireless transmission is denoted by reference numeral 402. The one or more storage devices 410 may also store other computer software instructions or programs to implement apparatuses and methods described in embodiments. The system computer 405 may be coupled (e.g., wirelessly coupled) to one or more output storage devices 420, which may receive the results of computer implemented processes or methods performed by the system computer 405. A personal computer 425 may be coupled (e.g., wirelessly coupled) to one or more output storage devices 420 and/or to the system computer 405 so that a user may utilize a user interface of the personal computer 425 to input information or obtain the results of the computer implemented processor methods performed by the system computer 405. The one or more storage devices 420 may also store other computer software instructions or programs to implement apparatuses and methods described in embodiments.

A user interface of the personal computer 425 may include, for example, one or more of a keyboard, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a remote controller, a portable (e.g., cellular or smart) phone, a tablet PC, a pedal or footswitch, a virtual-reality device, and so on. The user interface may further include a haptic device to provide haptic feedback to a user. The user interface may also include a touchscreen, for example. In addition, a personal computer 425 may be a desktop, a laptop, a tablet, a mobile phone or any other personal computing system.

Processes, functions, methods, and/or computer software instructions or programs in apparatuses and methods described in embodiments herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The one or more databases may include a collection of data and supporting data structures which may be stored, for example, in the one or more storage devices 410 and 420. For example, the one or more storage devices 410 and 420 may be embodied in one or more non-transitory computer readable storage media, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage devices 410 and 420 are not limited to the above description, and the storage may be realized by other various devices and structures as would be understood by those skilled in the art.

Figure 5:
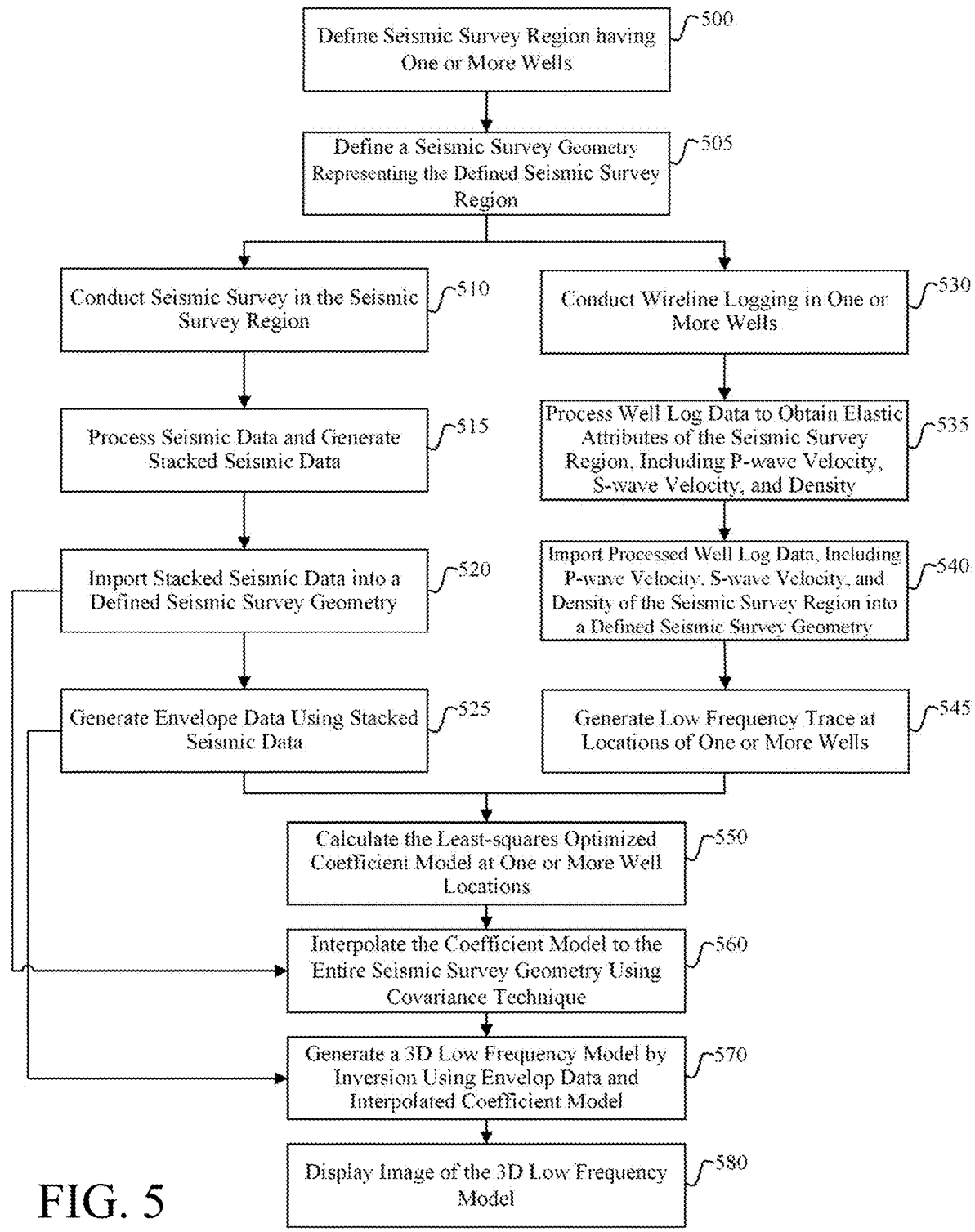
FIG. 5 is a flowchart illustrating a method for building a low frequency model improve the accuracy of seismic inversion to enhance reservoir characterization according to an embodiment.

FIG. 5 is a flowchart illustrating a method for building a low frequency model to fill the low frequency gap of seismic data to improve the accuracy of seismic inversion to improve images of subsurface structures in a survey region for reservoir characterization according to an embodiment. The survey region may be subsurface structures under land or subsurface structures under a body of water such as an ocean. The survey region may be the top surface of land or the top surface of a bottom of a body of water such as an ocean. In addition, the high-performance computer system such as the high-performance computer system shown in FIG. 4 may perform one or more of the operations in the flowchart shown in FIG. 5.

Referring to operation 500, a seismic survey region having one or more wells is defined. In operation 505, a seismic survey geometry, which represents the defined seismic survey region having one or more wells, is defined (established or set up). The seismic survey geometry is also a defined uniform three-dimensional (3D) sampling space representing the defined seismic survey region. The seismic survey geometry is a working data space (data space or working area) that stores the seismic data, elastic properties, acoustic properties, well log data, and other geological attributes.

Examples of other geological attributes may include amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, and integrated absolute amplitude. As indicated above, the data, properties, and/or attributes of the seismic survey region may be stored in the working data space of the defined seismic survey geometry.

In operation 505, the seismic survey geometry includes the range of inline number, crossline number, and the spatial coordinates for source and receiver locations. A source location may be a shot, which is the location of a blast, or the location of a sonic generator. A receiver location may be the position of a receiver to receive seismic waves which may be reflections and/or refractions of seismic waves, which were initially generated by a blast or seismic generator. Source and receiver locations may be located in the seismic survey region. In addition, a source location may be a location of one or more sonic generators of one or more well logging tools 315, and a receiver location may be a location of one or more well log data recording sensors of one or more of the well logging tools 315. The location of well logging tool may be a wellbore of a well.

In an example, a seismic survey geometry in operation 505 may represent an actual two-dimensional (2D) seismic survey region, which may be in the shape of a rectangle, along with time being the third dimension of the seismic survey geometry. An example of a rectangle is a square. For example, the two-dimensional seismic survey region may be 10 kilometers by 10 kilometers. In this example, this two-dimensional seismic survey region may be the top of the earth's surface (land surface) or the top of the bottom surface under a body of water such as an ocean. If three vertices of the actual rectangle are known, the fourth vertex of the rectangle can easily be calculated. The actual rectangle of the two-dimensional survey region may be represented by two different axes using inline numbers and crossline numbers in the seismic survey geometry. For example, inline numbers of the two-dimensional survey region may appear on a vertical axis of a rectangle and crossline numbers may appear on a horizontal axis of the rectangle. The spatial coordinates of source and receiver locations may be defined by an inline number and a crossline number in operation 505. With respect to the seismic survey geometry, inline numbers, crossline numbers, and time define a uniform three-dimensional (3D) sampling space representing the defined seismic survey region.

In the flowchart in FIG. 5, operation 505 may be performed again after operations 510 and 530, which obtain information regarding the seismic survey region. Operation 505 may also be performed again after operations 515 and 535, which process obtained information regarding the seismic survey region. However, operation 505 must be performed before operations 520 and 540 in FIG. 5. In addition, some of operations 510 through 545 may be performed simultaneously or at different times. For example, operations 510 and 530 may be performed simultaneously or at different times. However, operations 500 through 545 must be performed before operation 550.

Referring to operation 510, a seismic survey in the survey region is conducted to generate seismic data. For example, explosives may be detonated to generate blasts at locations in the seismic survey region to generate waves, which are reflected and/or refracted by the subsurface structures (formations). These reflections and/or refractions are referred to as seismic data. In operation 515, the seismic data from the seismic data recording sensors 105 is processed to generate stacked seismic data of the seismic survey region. The seismic data may be processed to generate stacked seismic data using the computer system shown in FIG. 4. The stacked seismic data are a three-dimensional volume with time as a vertical axis and with an inline number and a cross line number as the horizontal axes of the three-dimensional volume. The stacked seismic data can be generated by stacking the post-mitigated angle image gathers along reflection angles.

The stacked seismic data is imported into the defined seismic survey geometry in operation 520. Thereafter, in operation 525, three-dimensional (3D) envelope data is generated using the imported stacked seismic data. In this example, the envelope of seismic data (envelope data) is calculated from the complex trace of the seismic data. The envelope data displays the strong events from the seismic data. The envelope data contains the low frequency components that lacks in the conventional seismic data and highlights main seismic features, such as main geological structure of seismic data. Those advantages of the envelope data are desirable for the low frequency model building.

For example, the envelope technique proposed by Wu et al. (Wu, R. S., J. Luo, and B. Wu, 2014, Seismic envelope inversion and modulation signal model: Geophysics, 79, no. 3, WA13-WA24) can extract the ultra-low frequency signals that are contained in the imported stacked seismic data and therefore can recover the long-wavelength low frequency model structure. The computation process basically includes two steps: (1) compute analytic transform of stacked seismic data to generate analytic signals and (2) compute the magnitude of the analytic signals by applying a power function to obtain three-dimensional (3D) envelope data. The three dimensions are inline, crossline, and time.

Figure 6:
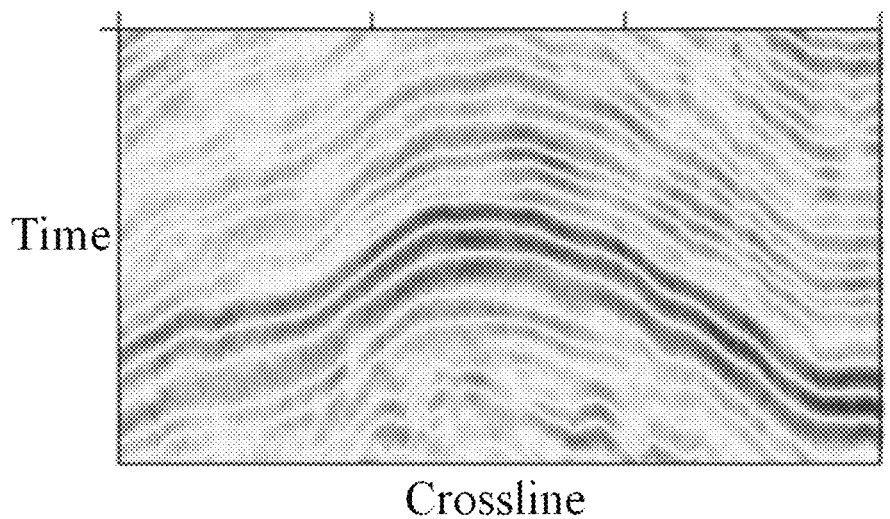
FIG. 6 is an example of stacked seismic data according to an embodiment.
Figure 7:
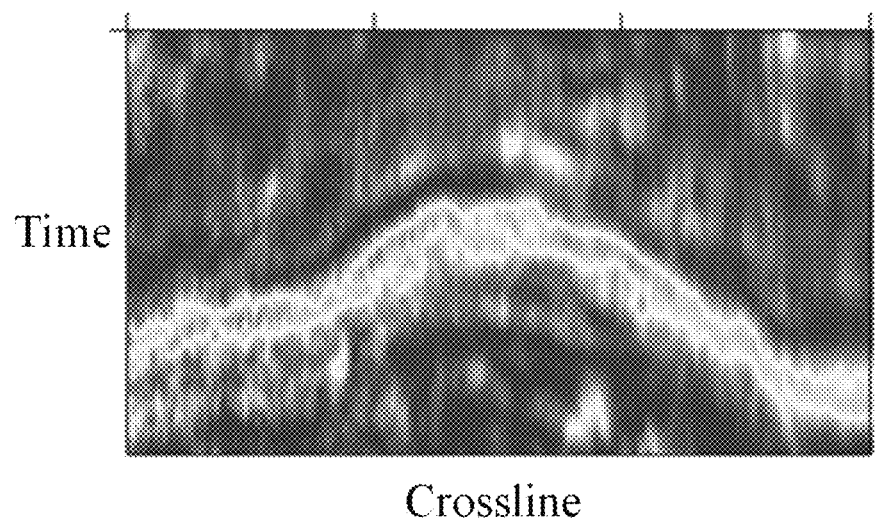
FIG. 7 is an example of envelope data computed from the stacked seismic data shown in FIG. 6 according to an embodiment.

FIG. 6 is an example including stacked seismic data, which must be transformed, before computing the magnitude of the analytic signals by applying a power function to obtain 3D envelope data. FIG. 7 shows an example of envelope data computed from the stacked seismic data shown in FIG. 6, where the envelope data tracks a low frequency component of the stacked seismic data and extracts the geological structure of seismic data. In FIGS. 6 and 7, the horizontal axis is crossline and the vertical axis is time. In an alterative embodiment, stacked seismic data and envelope data may be shown by referring to a horizontal axis, which is inline, and a vertical axis, which is time. Note that operation 525 generates three-dimensional (3D) envelope data of which FIG. 7 is a two-dimensional (2D) slice.

Figure 8:
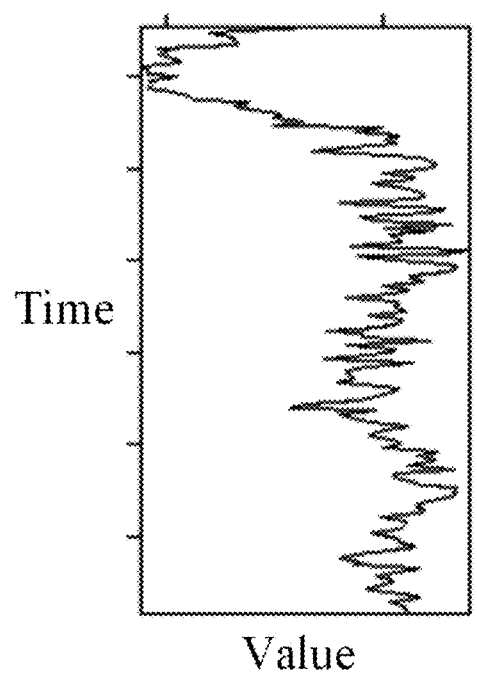
FIG. 8 is an example of processed well log data according to an embodiment.
Figure 9:
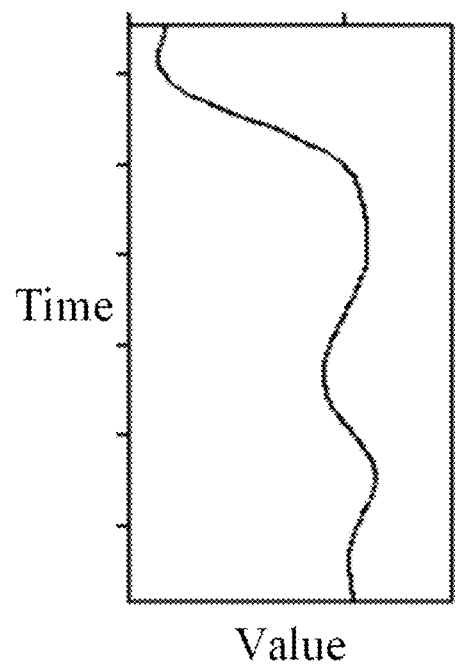
FIG. 9 is an example of a low frequency trace generated based on processed well log data in FIG. 8 according to an embodiment.

Referring to operation 530, wireline logging is conducted in one or more wells to obtain seismic data. While wireline logging is shown in operation 530, logging while drilling could also be used to obtain seismic data. An example of wireline logging in one well is shown in FIG. 3. The wireline logging operation shown in FIG. 3 may be performed in one or more wells in the seismic survey region. Wireline logging may be performed by lowering a well logging tool 315 on the end of a wireline into a wellbore 320 and recording well log data using well log data recording sensors. Thereafter, the well log data recording sensors process well log data to obtain elastic attributes of the seismic survey region including P-wave velocity, S-wave velocity, and density in operation 535. The processed well log data may also be referred to as upscaled well log data. FIG. 8 is an example processed well log data according to an embodiment. This processed well log data including P-wave velocity, S-wave velocity and density of the seismic survey region are imported into the defined seismic survey geometry in operation 540. Based on the processed well log data, a low frequency trace at locations of one or more wells is generated in operation 545. Operation 545 is similar to obtaining known values in an interpolation process. More specifically, in operation 545, a low pass filter may be applied to the processed well log data imported into the survey region geometry in order to retain the desired low frequency content while removing higher frequency information at locations of one or more wells in the seismic survey geometry. FIG. 9 is an example of a low frequency trace generated based on the processed well log data in FIG. 8 according to an embodiment. In FIGS. 8 and 9, the horizontal axis is value and the vertical axis is time. Here, the value represents the measured data for a well log. For example, the typical value for a P-wave velocity log is from 2000 m/s to 6000 m/s.

Operation 550 is also performed based on the elastic envelope data generated in operation 525 and the low frequency trace(s) at one or more well locations generated in operation 545. In operation 550, a least-squares optimized coefficient model is calculated at one or more well locations. The least-squares optimized coefficient model may be referred to as the coefficient model. The coefficient model is generated or calculated for one or more well locations in the seismic survey geometry. More specifically, a coefficient model may be generated at each well location in the seismic survey region. A coefficient model is used to estimate the relationship between envelope data generated in operation 525 and a low frequency model. The envelope data generated in operation 525 is needed to calibrate a low frequency model from both an amplitude and a phase perspective. The input data, which is input into operation 550, are the envelope data from operation 525 and the low frequency trace at one or more well locations. The coefficient model may be denoted by m' and may be defined as a two-dimensional (2D) table with the samples of coefficients as a first dimension, and a well location as the second dimension.

Figure 10:
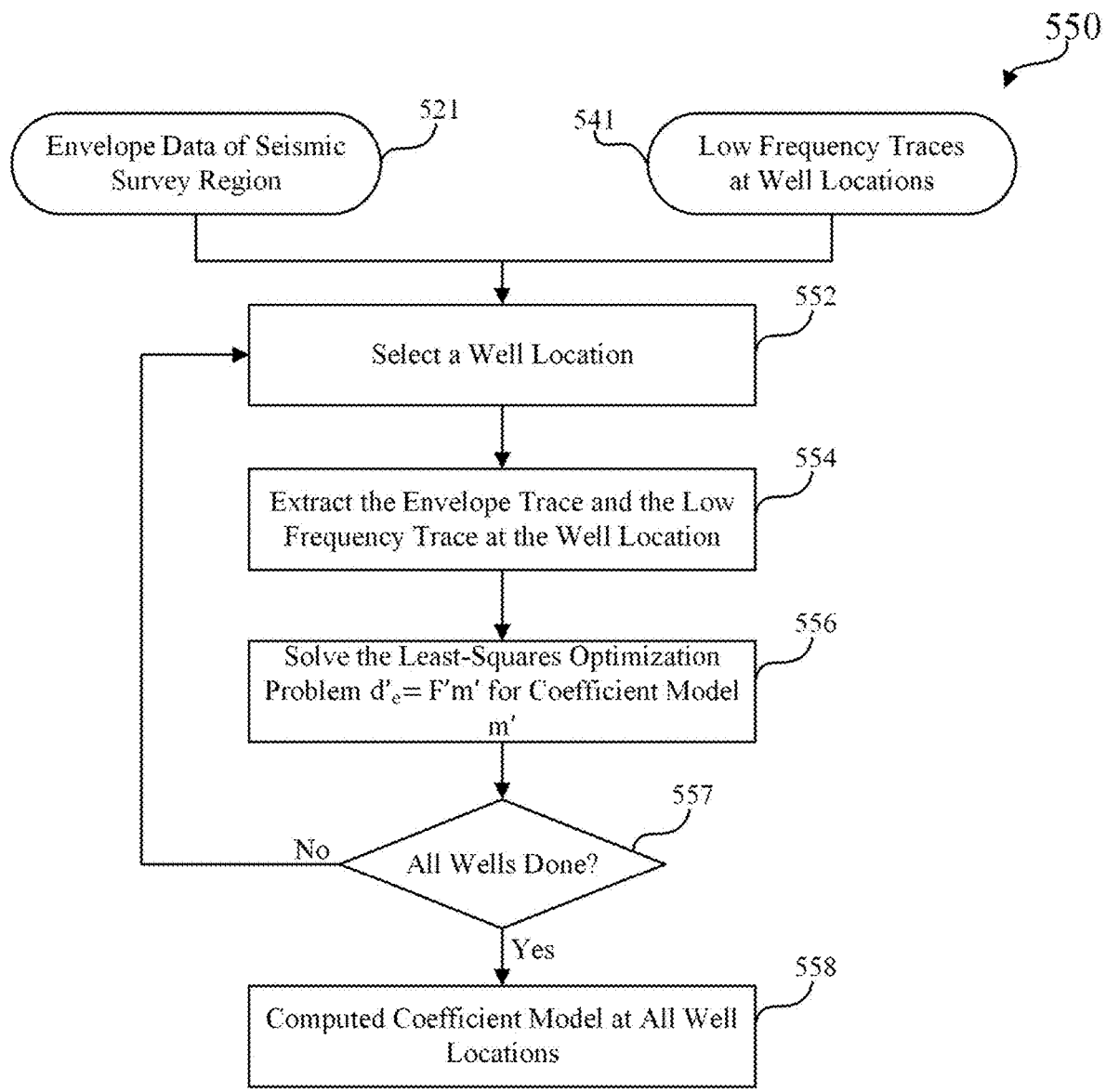
FIG. 10 is a flowchart illustrating operation 550 of calculating the least-squares optimized coefficient model at one or more well locations in FIG. 5.

FIG. 10 is a flowchart illustrating an operation 550 of calculating a least-squares optimized coefficient model at one or more well locations in FIG. 5 in more detail. As shown in FIG. 10, envelope data of the seismic region denoted by reference numeral 521 and a low frequency traces (one at each well location) denoted by reference numeral 541 are input into operation 550. In operation 552, a well location from one or more well locations in the seismic survey region is selected. In operation 554, a low frequency trace of the selected well location is extracted and an envelope trace is extracted from the envelope data 521 for the selected well location. Thereafter, the extracted envelope trace and the extracted low frequency trace are used to solve a least-squares optimization problem d'e=F'm' for a coefficient model m' in operation 556. A linear equation system is built by combining those trace selections, and the coefficient model can be solved by using multivariate regression to the following equation:

$$\Psi = \min \|d'_e - F'm'\|_2, \tag{1}$$

where $\Psi$ denotes the multivariate regression objective function, $d'_e$ denotes the computed envelope trace at the specific well location, m' denotes the coefficient model, F' is the operator that contains low frequency trace at the specific well location. The multivariate regression problem can be solved by using the conjugate gradient method, which performs a series of iterations, using the norm error $\|d'_e - F'm'\|_2$ with a user defined tolerance value, until it stops when the norm error is less than the tolerance value. As discussed above, a coefficient model m' may be a two-dimensional (2D) table with the samples of coefficients as the first dimension, and the well location as the second dimension.

Referring to operation 557, if a coefficient model has not been calculated for each well location, then the process in FIG. 10 returns to operation 552 to select another well location to obtain a coefficient model the another well location. When a coefficient model has been generated (calculated) at each well location, the coefficient model at each well location is output at operation 558 (which is also the output of operation 550) in FIGS. 5 and 10.

Figure 11:
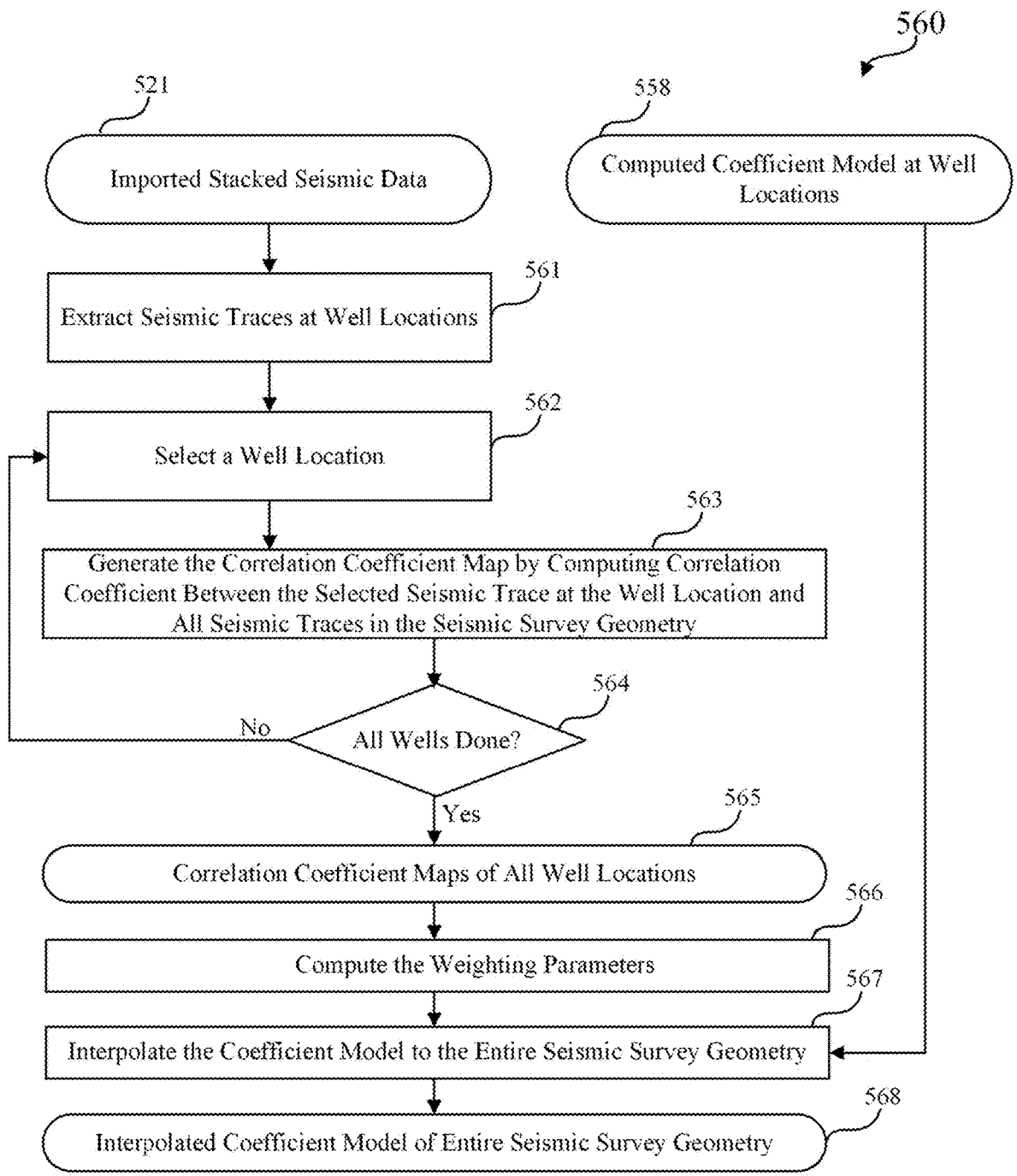
FIG. 11 is a flowchart illustrating operation 560 of interpolating the coefficient model to the seismic survey geometry representing the seismic survey region using a survey covariance technique in FIG. 5.

Referring to operation 560 in FIG. 5, further detailed in FIG. 11, each coefficient model output by operation 550 is interpolated to the seismic survey geometry representing the seismic survey region using a covariance technique. More specifically, a coefficient model m' (which may be defined as a two-dimensional (2D) table with the samples of coefficients as a first dimension, and a well location as the second dimension a two-dimensional table) from sparse well locations is interpolated to the coefficient model m in the three-dimensional (3D) sampling space of the seismic survey geometry defined in operation 505. FIG. 11 is a flowchart illustrating an operation of interpolating the coefficient model m' to the seismic survey geometry representing the seismic survey region using a survey covariance technique.

Referring to FIG. 11, imported stacked seismic data of the seismic survey geometry, which is output from operation 520 and denoted by reference numeral 521, and the coefficient model at each well location from operation 558, are inputted into operation 560 in FIG. 5. The stacked seismic data of the seismic survey region was imported into the three-dimensional sampling space of the seismic survey geometry in operation 520. Accordingly, the imported stacked seismic data 521 is in three dimensions. From the imported stacked seismic data 521, operation 560 extracts seismic traces at one or more well locations in operation 561. Thereafter, a well location is selected (operation 562) and a correlation map is generated by computing the correlation coefficient between the seismic trace at the selected well location and all seismic traces in the seismic survey geometry. If it is determined that all well locations do not have a generated correlation map in operation 564, the process returns to operation 562 to select another well location. Operations 562 through 564 are repeated until all well locations are selected and the outcome for this process is the correlation coefficient maps for all well locations, which is denoted by reference numeral 565.

Referring to operation 566, the weighting parameters are computed (calculated) using the correlation coefficient maps at the well locations. The formula (equation) for calculating a weighting parameter p at a given point x in the survey based on the values extracted from the correlation maps is the following:

$$p_i(x) = \begin{cases} \dfrac{\hat{v}_i(x)}{\sum_{i=1}^{N} \hat{v}_i(x)}, & \text{if } v_i \neq 1 \text{ for all } i, \\ 1, & \text{if any } v_i = 1 \text{ for some } i, \end{cases} \tag{2}$$

where $\hat{v}$ denotes the mathematical transformation from v with power parameter, $p_i(x)$ denotes the weighting parament p at a given point x, and N denotes the number of well locations.

Then, the coefficient model m of the 3D sampling survey space can be computed by using the weighting parameters from equation (2) and the computed coefficient model at the well locations from operation 558 to interpolate the coefficient model of the seismic survey geometry using the following equation:

$$m(x) = \sum_{i=1}^{N} p_i(x) m'_i \quad (3)$$

where the subscript i denotes the index of well location, $p_i(x)$ denotes the weighting parament p at a given point x, and N denotes the number of well locations. m(x) denotes the coefficient model at a given point x, and $m'_i$ denotes the two dimensional (2D) coefficient model at the well location. The process is not completed until all spatial locations in the survey geometry are computed and the interpolated coefficient model of the seismic survey geometry representing the seismic survey region is output as denoted by reference numeral 568.

As shown above, the coefficient model of the survey space is not merely an averaging means of the localized coefficient models. Rather, it takes into account the coherence of seismic data. The method of obtaining the coefficient model of generally includes three steps: (1) generating the correlation map by computing correlation coefficient between the selected seismic trace and all seismic traces of in the survey; (2) computing the weighting parameters; and (3) interpolating the coefficient model to the whole survey space. This interpolation process does not affect the accuracy of any localized coefficient model. Accordingly, this method is applicable even if there is only one well in the entire survey space.

Figure 12:
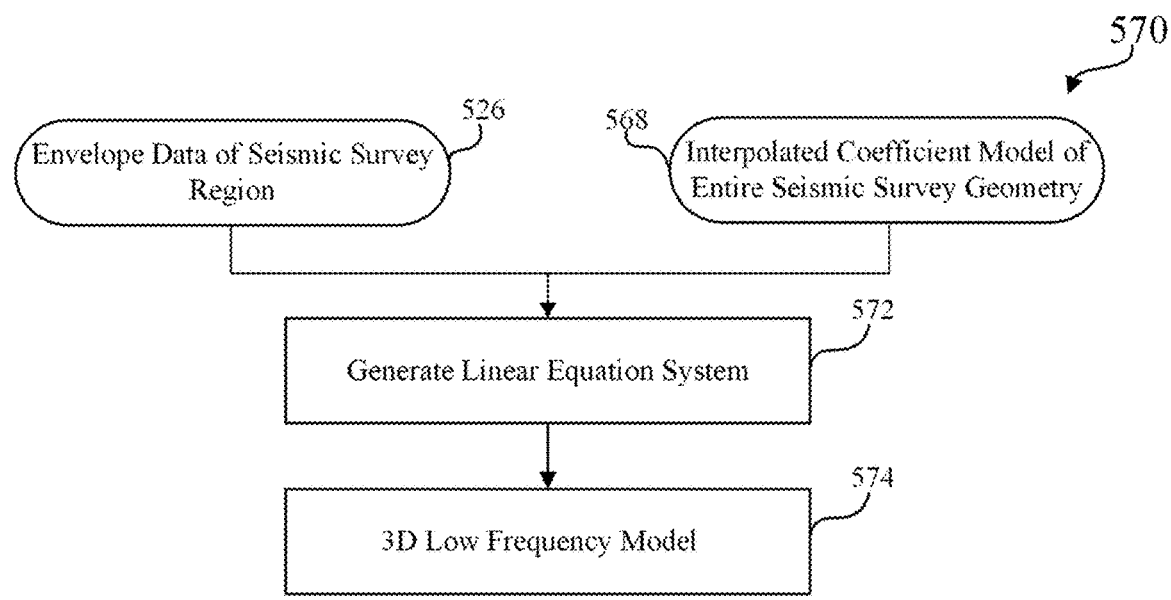
FIG. 12 is a flow chart illustrating operation 570 of generating a 3D low frequency model by inversion using envelope data and interpolated coefficient model in FIG. 5.

FIG. 12 is a flow chart illustrating an operation 570 of generating a 3D low frequency model using envelope data and the interpolated coefficient model of operation 560 in FIG. 5. Operation 570 receives as input envelope data of the seismic survey region denoted by reference numeral 526 from operation 525 and interpolated coefficient model of the seismic survey geometry from operation 560 as input in order to generate a three-dimensional low frequency model by inversion in operation 570. As shown in FIG. 12, a linear equation system is generated in operation 572. The linear equation system is built by combining the 3D coefficient model and the computed envelope data by using multivariate regression in the following equation:

$$\Psi = \min \|d_e - Mx\|_2 \quad (4)$$

where $\Psi$ denotes the multivariate regression objective function, $d_e$ denotes the computed envelope data in the whole survey, and M is the operator that contains the coefficient model. The output of operation 570 is the low frequency model x. This inversion process can be solved by using a conjugate gradient method.

Once the three-dimensional low frequency model of the seismic survey geometry is generated (which represents the low frequency model of the seismic survey region), an image of the three-dimensional low frequency model is displayed on a display in operation 580.

Figure 13:
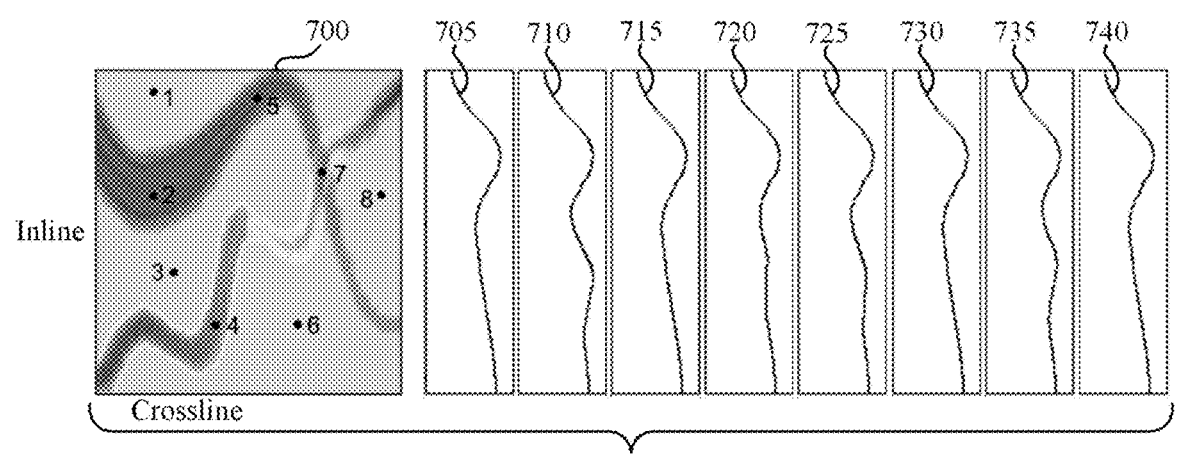
FIG. 13 is a map showing stacked seismic data and low frequency traces at 8 well locations.
Figure 14:
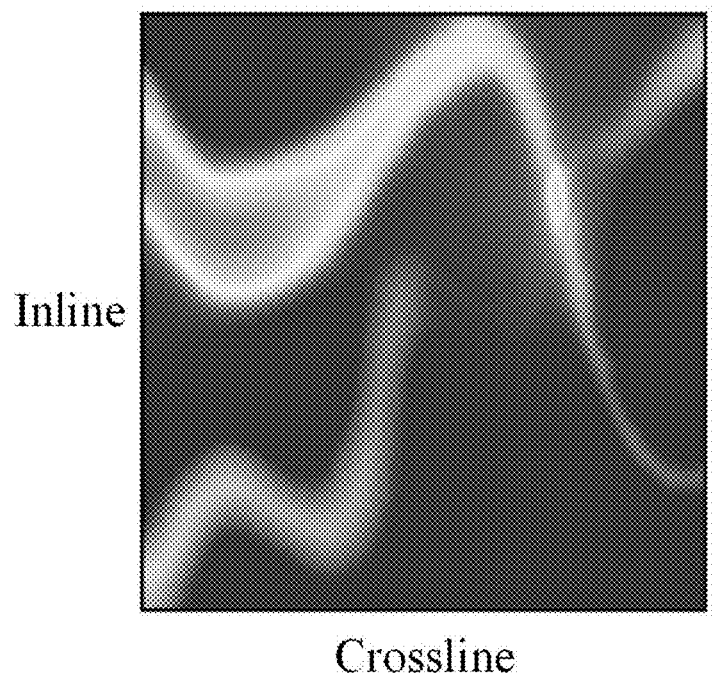
FIG. 14 is a map showing a final frequency model using a method according to an embodiment.

FIG. 13 is a map showing stacked seismic data and low frequency traces at each well location. The image denoted by reference numeral 700 shows a time slice of the imported stacked seismic data (which is stacked in three dimensions) and overlaid with eight sparse well locations. The black dots in the image 700 represent the sparse well locations along with the well number from one to eight, respectively. Lines 705, 710, 715, 720, 725, 730, 735, and 740 show the corresponding low frequency traces at the eight well locations from one to eight, respectively in operation 545 of FIG. 5. These low frequency traces will be input into operation 550 along with envelope data to calculate the least-squares optimized coefficient models for each well location, which is then interpolated in operation 560 in order to generate a three-dimensional low frequency model in operation 570, which is shown in FIG. 14. This example includes two horizontal distributed channels and the amplitude variation of the channels in the image 700, which is mainly caused by the lithology changes. In this example, FIG. 13 shows an amplitude change and a phase change in the lower channel (the channel from bottom left to upper right). The changes in color represents phase change in seismic data. Referring to the bottom left of FIG. 13, the change in color represents the amplitude change in the seismic data. By utilizing methods and apparatuses of the present invention, these features in the seismic data bay be used to build a low frequency model.

Figure 15:
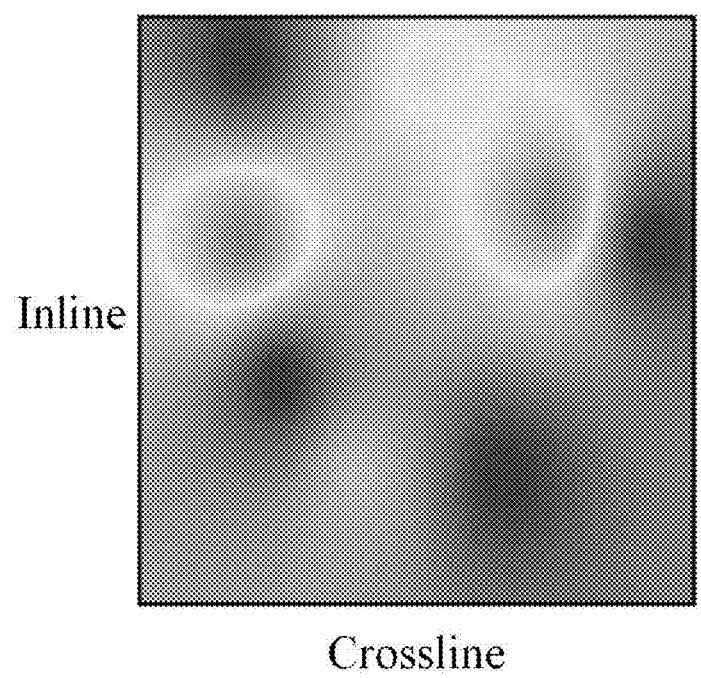
FIG. 15 is a map showing a final frequency model according to a conventional method.

FIG. 14 is a map showing a low frequency model output from operation 570 using a method according to an embodiment in FIG. 5, and FIG. 15 is a map showing a low frequency model output according to a conventional method using the same data. FIG. 14 shows an accurate low frequency model for reservoir characterization using an embodiment shown in FIG. 5. However, as shown in FIG. 15, traditional methods, such as an inverse distance weighting interpolation method, Kriging method, Hale's method, do not accurately capture the amplitude and phase information embedded in the seismic data needed for generating an accurate low frequency model. These traditional methods do not generate envelope data in combination with generated low frequency trace, which are then used by operations 550 through 570 in FIG. 5 to generate a 3D Low Frequency Model, which is displayed in operation 580 in FIG. 5. As a result, FIG. 15 shows one of the problems of the traditional methods, referred to as a bullseye effect. In contrast, FIG. 14 eliminates the bullseye effect of traditional methods and provide an enhanced image using the same set of seismic data.

Accordingly, embodiments build an improved low frequency model to regularize seismic inversion to fill the low frequency gap of seismic data to improve the accuracy of seismic inversion to improve high-resolution images to improve lithology identification, fluid discrimination, and reservoir characterization of subsurface structures of a survey region in the field of seismic exploration.

While embodiments of this disclosure have been shown and described, modifications can be made by one skilled in the art without departing from the spirit or teaching of this invention. The embodiments described herein are exemplary only and are not limiting. Many variations and modifications of methods, systems and apparatuses are possible and are within the scope of the invention. Accordingly, the scope of protection is not limited to the embodiments described herein, but is only limited by the claims. The scope of the claims shall include all equivalents of the subject matter of the claims.

What is claimed is:

1. A method for generating and displaying a low frequency model for a seismic survey region, the method comprising:
   positioning seismic data recording sensors in the seismic survey region at different locations;
   positioning a well logging tool including one or more well log data recording sensors in one or more wells in the seismic survey region;

blasting at points of incidence in the seismic survey region to generate seismic waves, which travel through subsurface structures;

sensing the seismic waves and recording seismic data using the seismic data recording sensors;

sensing and recording well log data using the well log data recording sensors;

transmitting the seismic data from the seismic data recording sensors to a computer system including one or more memories and storing the seismic data in one or more memories;

transmitting the well log data from the well log data recording sensors to a computer system including one or more memories and storing the well log data in one or more memories;

defining a seismic survey geometry of the seismic survey region;

processing seismic data to generate a stacked seismic data;

processing well log data to obtain elastic attributes;

importing stacked seismic data into the defined seismic survey geometry;

importing processed well log data into the defined seismic survey geometry;

generating envelope data using the stacked seismic data in the defined seismic survey geometry;

generating a low frequency trace for each well in the seismic survey region;

calculating a least-squares optimized coefficient model at each well location based upon the generated envelope data and the low frequency trace for each well;

interpolating the coefficient model to the seismic survey geometry using a covariance technique and the imported stacked seismic data;

generating a three-dimensional low frequency model by inversion using the envelope data and the interpolated coefficient model; and displaying image of the generated three-dimensional low frequency model of the seismic survey region.

2. The method of claim 1, wherein the elastic attributes include one or more of P-wave velocity, S-wave velocity, and density.

3. The method of claim 1, wherein the one or more wells in the seismic survey region is a plurality of wells and wherein a plurality of well locations has one of the plurality of wells.

4. The method of claim 3, wherein the seismic survey geometry of the seismic survey region includes envelope data for each well at each well location and a low frequency trace for each well at each well location.

5. The method of claim 4, wherein the calculating a least-squares optimized coefficient model at each well location based upon the generated envelope data and the low frequency trace for each well further comprises:

(a) selecting a well location;

(b) extracting an envelope trace from the generated envelope data for the selected well location and extracting the low frequency trace for the selected well location from a plurality of low frequency traces; and (c) solving a least squares optimization problem $d'_e = F'm'$ for a coefficient model m' at the well location, where, d' denotes the extracted envelope trace at the well location, and F' denotes an operator that contains low frequency trace at the well location.

6. The method of claim 5, wherein the calculating a least-squares optimized coefficient model at each well location based upon the generated envelope data and the low frequency trace for each well further comprises:

(d) repeating operations (a) through (c) until the least squares optimization problem is solved for each well; and (e) outputting the computed coefficient model at each well location.

7. The method of claim 6, wherein the interpolating the coefficient model to the seismic survey geometry using a covariance technique and using the imported stacked seismic data comprises:

(f) extracting seismic traces at each well location;

(g) selecting a well location from the plurality of well locations;

(h) generating a correlation map by computing a correlation coefficient between the seismic trace at the selected well location and all seismic traces in the seismic survey geometry;

(i) repeating operations (g) and (h) until the correlation map has been generated for each well location in the seismic survey geometry;

(j) outputting correlation coefficient maps at all well locations;

(k) computing weighting paraments for all well locations;

(l) interpolating each coefficient model at each well location to an entirety of the seismic survey geometry; and (m) outputting the interpolated coefficient model to the entirety of the seismic survey geometry.

8. The method of claim 7, wherein the weighting parameters are computed using the following equation:

$$p_i(x) = \begin{cases} \dfrac{\hat{v}_i(x)}{\sum_{i=1}^{N} \hat{v}_i(x)}, & \text{if } v_i \neq 1 \text{ for all } i, \\ 1, & \text{if any } v_i = 1 \text{ for some } i, \end{cases}$$

where, $\hat{v}$ denotes a mathematical transformation from v with power parameter, i denotes an index of well location, $p_i(x)$ denotes a weighting parament p at a given point x, and N denotes a number of well locations.

9. The method of claim 8, wherein the interpolating the coefficient model to the seismic survey geometry using a covariance technique and the imported stacked seismic data further comprises inputting the computed coefficient model at each well location and interpolating the coefficient model to the seismic survey geometry based on the computed coefficient model at each well location and weighted parameters in accordance with the following equation:

$$m(x) = \sum_{i=1}^{N} p_i(x) m'_i$$

where the subscript i denotes the index of well location, $p_i(x)$ denotes the weighting parament p at a given point x, N denotes the number of well locations, m(x) denotes the coefficient model at a given point x, and $m'_i$ denotes the coefficient model at the well location.

10. The method of claim 9, wherein the generating the three-dimensional low frequency model by inversion using the envelope data and the interpolated coefficient model comprises combining the interpolated coefficient model and the envelope data using a multivariate regression $$\Psi = \min \|d_e - Mx\|_2$$

where Ψ denotes a multivariate regression objective function, $d_e$ denotes a computed envelope data in the whole survey, M is an operator that contains the coefficient model, and x is the low frequency model.

11. A system for generating and displaying a low frequency model for a seismic survey region, the system comprising:
  a blasting device positioned at each point of incidence in the seismic survey region to generate seismic waves, which travel through subsurface structures;
  a plurality of seismic data recording sensors, which are positioned in the seismic survey region at different locations to sense and record seismic data and to transmit the seismic data to a computer system including one or more memories which store the seismic data in the one or more memories; and
  a well logging tool including one or more well log data recording sensors, which is positioned in one or more well bores in the seismic survey region, to sense and record well log data and to transmit the well log data to the computer system including the one or more memories which store the well log data;
  wherein the computer system further includes at least one processor and stores instructions in the one or more memories, and wherein the one or more processors execute the instructions stored in the one or more memories to implement:
  defining a seismic survey geometry of the seismic survey region;
  processing seismic data to generate a stacked seismic data;
  processing well log data to obtain elastic attributes;
  importing stacked seismic data into the defined seismic survey geometry;
  importing processed well log data into the defined seismic survey geometry;
  generating envelope data using the stacked seismic data in the defined seismic survey geometry;
  generating a low frequency trace for each well in the seismic survey region;
  calculating a least-squares optimized coefficient model at each well location based upon the generated envelope data and the low frequency trace for each well;
  interpolating the coefficient model to the seismic survey geometry using a covariance technique and the imported stacked seismic data;
  generating a three-dimensional low frequency model by inversion using the envelope data and the interpolated coefficient model; and
  displaying image of the generated three-dimensional low frequency model of the seismic survey region.

12. The system of claim 11, wherein the elastic attributes include one or more of P-wave velocity, S-wave velocity, and density.

13. The system of claim 11, wherein the one or more wells in the seismic survey region is a plurality of wells and wherein a plurality of well locations has one of the plurality of wells.

14. The system of claim 13, wherein the seismic survey geometry of the seismic survey region includes envelope data for each well at each well location and a low frequency trace for each well at each well location.

15. The system of claim 14, wherein the calculating a least-squares optimized coefficient model at each well location based upon the generated envelope data and the low frequency trace for each well further comprises:

(a) selecting a well location;
  (b) extracting an envelope trace from the generated envelope data for the selected well location and extracting the low frequency trace for the selected well location from the plurality of low frequency traces; and
  (c) solving a least squares optimization problem $d'_e = F'm'$ for a coefficient model m' at the well location, wherein d' denotes the extracted envelope trace at the well location, and F' denotes an operator that contains low frequency traces at the well location.

16. The system of claim 15, the calculating a least-squares optimized coefficient model at each well location based upon the generated envelope data and the low frequency trace for each well further comprises:
  (d) repeating operations (a) through (c) until the least squares optimization problem is solved for each well; and
  (e) outputting the computed coefficient model at each well location.

17. The system of claim 16, wherein the interpolating the coefficient model to the seismic survey geometry using a covariance technique and using the imported stacked seismic data comprises:
  (f) extracting seismic traces at each well location;
  (g) selecting a well location from the plurality of well locations;
  (h) generating a correlation map by computing a correlation coefficient between the seismic trace at the selected well location and all seismic traces in the seismic survey geometry;
  (i) repeating operations (g) and (h) until the correlation map has been generated for each well location in the seismic survey geometry;
  (j) outputting correlation coefficient maps at all well locations;
  (k) computing weighting paraments for all well locations;
  (l) interpolating each coefficient model at each well location to an entirety of the seismic survey geometry; and
  (m) outputting the interpolated coefficient model to the entirety of the seismic survey geometry.

18. The system of claim 17, wherein the weighting parameters are computed using the following equation:

$$p_i(x) = \begin{cases} \dfrac{\hat{v}_i(x)}{\sum_{i=1}^{N} \hat{v}_i(x)}, & \text{if } v_i \neq 1 \text{ for all } i, \\ 1, & \text{if any } v_i = 1 \text{ for some } i, \end{cases}$$

where $\hat{v}$ denotes a mathematical transformation from v with power parameter, i denotes an index of well location, $p_i(x)$ denotes a weighting parament p at a given point x, and N denotes a number of well locations.

19. The system of claim 18, wherein the interpolating the coefficient model to the seismic survey geometry using a covariance technique and the imported stacked seismic data further comprises inputting the computed coefficient model at each well location and interpolating the coefficient model to the seismic survey geometry based on the computed coefficient model at each well location and weighted parameters in accordance with the following equation:

$$m(x) = \sum_{i=1}^{N} p_i(x) m'_i$$

where the subscript i denotes the index of well location, $p_i(x)$ denotes the weighting parament p at a given point x, and N denotes the number of well locations, m(x) denotes the coefficient model at a given point x, and m'i denotes the coefficient model at the well location.

20. The system of claim 19, wherein the generating the three-dimensional low frequency model by inversion using the envelope data and the interpolated coefficient model comprises combining the interpolated coefficient model and the envelope data using a multivariate regression $$\Psi = \min \| d_e - Mx \|_2$$

where $\Psi$ denotes a multivariate regression objective function, $d_e$ denotes a computed envelope data in the whole survey, M is an operator that contains the coefficient model, and x is the low frequency model.

* * * * *